United States Patent [19]
Pino

[11] Patent Number: 5,966,435
[45] Date of Patent: Oct. 12, 1999

[54] INTERMEDIATE SWITCH SERVICE MANAGEMENT SYSTEM ARCHITECTURE AND METHOD

[76] Inventor: Locillo G. Pino, 59 Brodeur Crescent, Kanata, Ontario, Canada, K2L 1Z2

[21] Appl. No.: 08/991,939

[22] Filed: Dec. 16, 1997

[51] Int. Cl.⁶ .............................. H04M 3/42; H04M 7/00
[52] U.S. Cl. .......................................... 379/207; 379/220
[58] Field of Search ..................... 379/207, 219, 379/220, 221, 230, 229, 201, 210, 211

[56] References Cited

U.S. PATENT DOCUMENTS

| | | | |
|---|---|---|---|
| 5,553,130 | 9/1996 | Turner | 379/207 |
| 5,598,464 | 1/1997 | Hess et al. | 379/207 |
| 5,625,681 | 4/1997 | Butler, II | 379/207 |
| 5,696,816 | 12/1997 | Sonnenberg | 379/220 |
| 5,717,748 | 2/1998 | Sneed, Jr. et al. | 379/207 |
| 5,732,131 | 3/1998 | Nimmagadda et al. | 379/211 |
| 5,793,857 | 8/1998 | Barnes et al. | 379/207 |

*Primary Examiner*—Harry S. Hong
*Assistant Examiner*—Benny Q. Tieu
*Attorney, Agent, or Firm*—Chupa & Alberti, P.C.

[57] ABSTRACT

An intermediate layer of switch service management between a number portability administration center and a switch selects those ported telephone numbers for in switch-based ported number routing, thus greatly improving the efficiency of number portability.

3 Claims, 6 Drawing Sheets

INTERMEDIATE SWITCH SERVICE MANAGEMENT SYSTEM ARCHITECTURE AND METHOD

CROSS-REFERENCE TO RELATED APPLICATION

This application is related to co-pending, commonly assigned, application Ser. No. 08/534,668 filed Sep. 27, 1995 by Edgar MARTINEZ et al., which is incorporated herein by reference.

BACKGROUND OF THE INVENTION

1. Field of the Invention

The present invention relates to telephone systems in general and to Intelligent Network (IN), Advanced Intelligent Network (AIN) systems and Computer Telephony Integration (CTI) in particular. More particularly still, it relates to telephone number portability, also known as local number portability (LNP) within such systems. More particularly yet, it relates to an intermediate service management system (SMS) architecture advantageous for LNP.

2. Prior Art of the Invention

North American Numbering Plan defines a telephone number as NPA-NXX-XXXX, (a glossary of abbreviations is found in the Appendix attached to this specification), where NPA are three digits which define the area code of the telephone subscriber, NXX indicates the switching exchange or switch where the subscriber is served. N represents a digit from 2 to 9 and X represents a digit from 0 to 9. The NPA has the NXX format.

A set of requirements has been defined for local Number Portability that defines the functionality for SSP (switches) STPs, SCPs, NPACs and L-SMS as well as the interfaces between these elements. These requirements describe how the LRN method uses AIN to a central LNP database (e.g. SCP) to access routing information for telephone numbers in areas where Number Portability occurs. A typical call flow in conformance with such requirements runs as follows:

1. Line A (708-224-1111) dials Line B (708-713-2222).
2. The Originating Switch performs digit analysis on the dialed digits to determine how to route the call. The switch determines that B is in a portable NPA-NXX (708-713) and the line does not reside on the switch.
3. The switch sends an AIN (info_Analyzed) or IN (InstructionStart) query based on the dialed digits to the LNP-SCP.
4. The LNP-SCP sends an AIN (Analyze_Route) or IN (ControlConnect) response containing the LRN of the Recipient Switch.
5. The Originating Switch receives the LNP-SCP response and analyzes the data. The LRN is translated in the LNP Routing Tables and an ISUP route out of the switch is determined. The LRN is stored in the CdPN parameter and the dialed digits are stored in the GAP parameter of the ISUP IAM message. The FCI Translated Called Number Indicator is set to indicate a query has been done (set to "translated number").
6. The call is routed to the Recipient Switch based on the LRN.
7. The Recipient Switch receives and processes the contents of the IAM message. The switch determines than an LRN is received and that it is the switch's LRN, and the switch replaces the CdPN parameter's contents with the dialed digits stored in the GAP parameter. The switch does digit analysis on the dialed digits and finds the subscriber on the switch.
8. The Recipient Switch completes the call to the subscriber.

This implementation relies heavily on the IN or AIN technology and is not efficient, since it is a complex protocol that must communicate across network elements while a call is in active progress.

U.S. Pat. No. 5,625,681 to Stratus "Method and Apparatus for Telephone Number Portability" relies on the AINs SCP, although it is somewhat short on implementation detail.

SUMMARY OF THE INVENTION

The present intermediate switch service management system architecture endeavours to lower switch realtime utilization for LNP (increasing the maximum number of lines a switch can support and relies on SS7 network utilization with less reliance on an SCP for LNP.

An advantage of the present intermediate architecture is that it utilizes the existing industry standard NPAC and merely adds an intermediate layer of software between the NPAC and at the switch, whether local or AT of a LATA.

Accordingly, an intermediate switch service management system (S-SMS) for improving local number portability (LNP) in telephony and the like switched communications system, includes:

(a) a plurality of databases at said S-SMS intermediate, a number portability administration center (NPAC) and a switching office;

(b) means at said S-SMS for downloading ported telephone numbers from said NPAC into said databases; and (c) means at said S-SMS for downloading selected ones from said ported telephone members into an LNP-database in said switching office.

A method of operating an intermediate switch service management system (S-SMS) for improving local number portability (LNP) includes the steps of:

(a) maintaining a plurality of databases at said S-SMS intermediate, a number portability administration center (NPAC) and a switching office;

(b) downloading ported telephone numbers from said NPAC into said databases;

(c) selecting telephone numbers that have been ported from said switching office from said ported telephone numbers; and (d) storing the telephone numbers selected in step (c) for storage in an LNP database in said switching office.

BRIEF DESCRIPTION OF THE DRAWINGS

The preferred embodiment of the present invention will now be described in conjunction with the annexed drawing figures, in which.

DETAILED DESCRIPTION OF THE PREFERRED EMBODIMENTS

Figure 1:
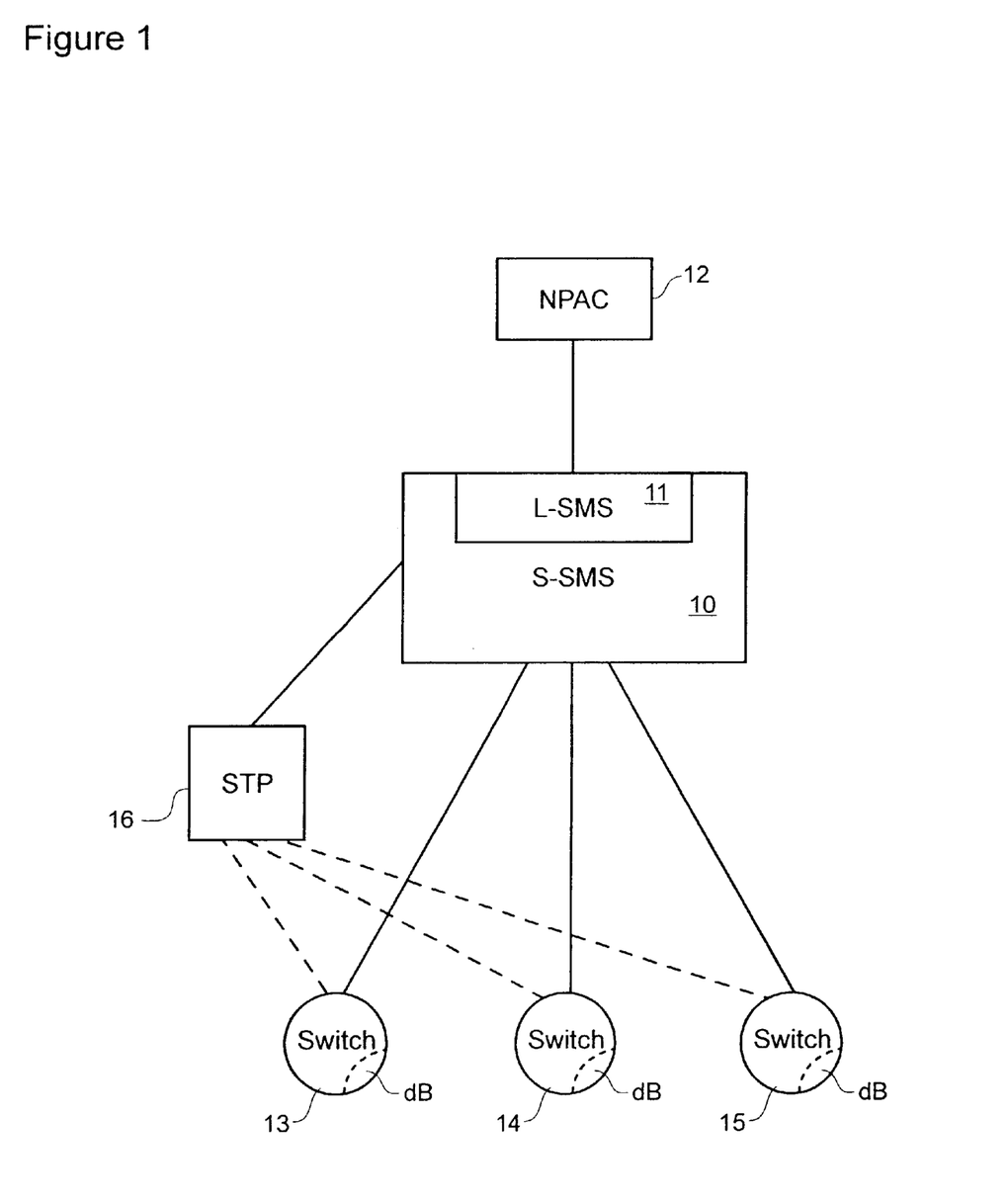
FIG. 1 is a very high-level block diagram illustrating the position of the intermediate S-SMS layer accordingly to the present invention.

Referring to FIG. 1 of the drawings, it illustrates the hierarchical structure of present day LNP architecture to which is added the intermediate S-SMS layer 10, while still incorporating the usual L-SMS 11 functions, both of which are intermediate to the NPAC 12 and switches (that is switching offices) 13, 14 and 15, and STP 16. In particular, the S-SMS 10 function is to manage switches 13, 14 and 15 databases (dB) in order to facilitate and render more efficient LNP.

Figure 2:
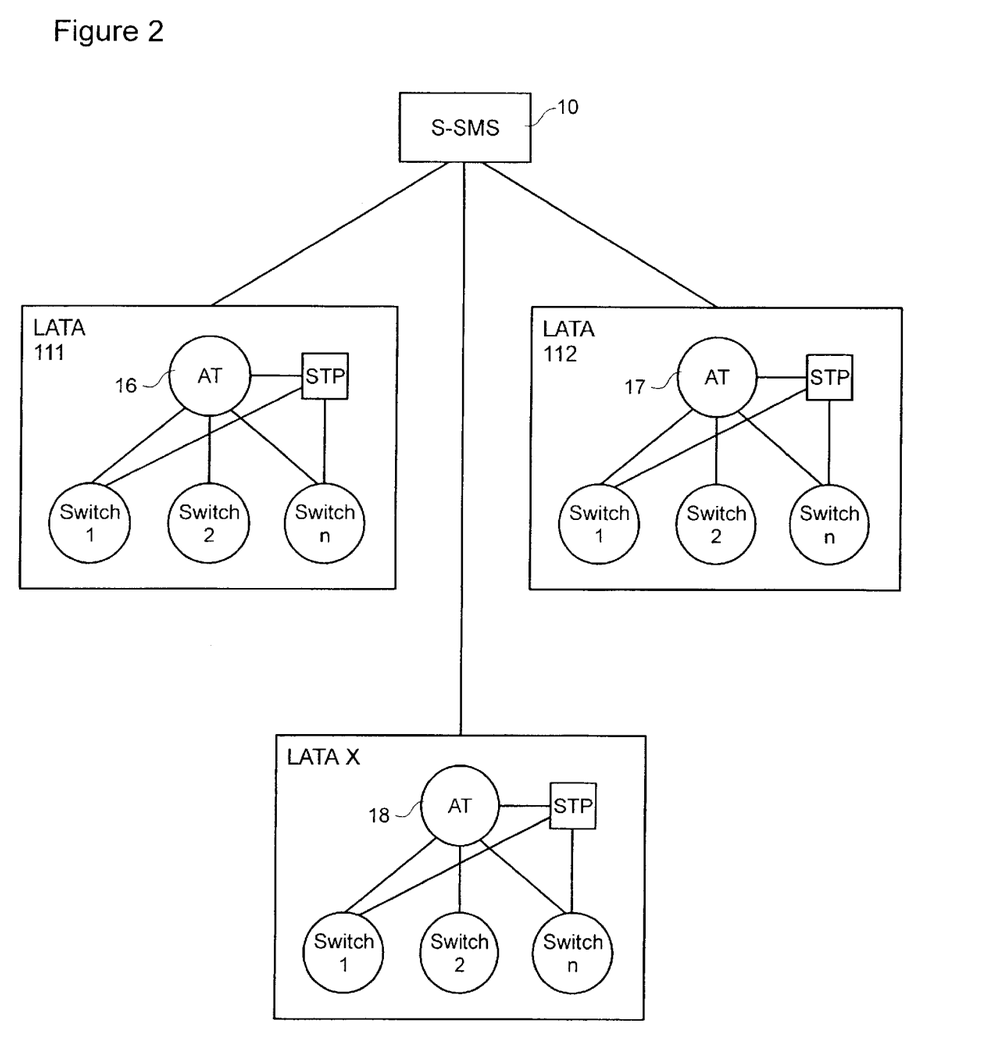
FIG. 2 is a very high-level block diagram illustrating an alternate position to that shown in figure of the intermediate S-SMS layer.

In FIG. 2, the S-SMS 10 function is identical to that in FIG. 1 except that the S-SMS 10 manages the databases in ATs 16, 17 and 18, and each of the subtending switches the AT serves, which belong to LATAs 111, 112 and LATA X, respectively.

Prior to describing the processes shown in FIGS. 3, 4, 5 and 6, by which the S-SMS 10 operates on the switch database (dB), it is necessary to discuss the preferred structures of such databases. In general, a "value" in dB can be read or can be stored. The operation GET is used to read, and the operation STORE is used to store, a value in the dB. The names of variables (i.e. values) are shown in italics in the flow charts of FIGS. 3, 4, 5 and 6. Following are six database formats and descriptions of their parameters as required for operation of the S-SMS software.

1. PORTED_TN_LRN Database

This database associates ported telephone number with their Location Routing Number. The version id is used to identify the current version of the TN record. In this case a versionid is generated based on the calendar date & time at which this TN became active. This database is downloaded from the NPAC. How it is downloaded is defined in the existing NPAC specification document.

| tn | lrn | dpc | version_id |
|---|---|---|---|
| 613-232-0001 | 613-999-9991 | 111 222 333 | 971009112936 |
| 613-232-0002 | 613-999-9991 | 111 222 333 | 971009112937 |
| 613-565-5678 | 613-888-8888 | 222 333 444 | 971009220152 |
| . | . | . | . |
| . | . | . | . |
| . | . | . | . |

Parameter Glossary:
 tn: ported telephone number—in this database the tn is the key used to index to the database
 lrn: location routing number
 version_id: date & time that this record was written giving this record a unique version number
 dpc: destination point code. Used by the SS7 network as addresses for SS7 components such as SSPs (switches), STPs or SCPs etc.

2. PORTED_NXX Database

| N-Index | nxx | lata_id |
|---|---|---|
| 1 | 613-232 | 111 |
| 2 | 613-565 | 111 |
| . | . | . |
| . | . | . |
| . | . | . |

This database provides a list of office codes, i.e. NPA-NXX that are portable. The NXXs listed in this database are downloaded from the NPAC. The lata_ids will need to be loaded by the operators of the S-SMS. Other groupings may be used other than LATAs if appropriate such as state, city, etc.

Parameter Glossary:

N_Index: integer key used to index the database
 nxx: A ported NPA-NXX. NPA-NXX are the first six digits of a ten digit telephone number. The NPA identifies the area code and the NXX identifies the office exchange.

3. PORTED_TN_NXX Database

This is a series of indexed databases. Each database is identified by a ported office code (see PORTED_NXX Database). There is one database associated with each ported NPA-NXX. Each database identifies the ported telephone numbers associated with that office code. Each database is sorted in increasing order of Ported TNs.

| TN_key | tn |
|---|---|
| PORTED_NXX(N_Index=1) =613-232 | |
| 1 | 613-232-0001 |
| 2 | 613-232-0002 |
| . | . |
| . | . |
| PORTED_NXX(N_Index=2) =613-565 | |
| 1 | 613-565-5678 |
| . | . |
| . | . |
| . | . |

Parameter Glossary:

TN—Key: integer key used to index the database
 tn: ported telephone number

4. RANGE Database

| Rng_key | start_range | end_range | lrn | dpc |
|---|---|---|---|---|
| 1 | 613-232-0001 | 613-232-0002 | 613-999-9991 | 111 222 333 |
| 2 | 613-565-5678 | 613-565-5678 | 613-888-8888 | 222 333 444 |
| . | . | . | . | . |
| . | . | . | . | . |
| . | . | . | . | . |

-continued

| Rng_key | start_range | end_range | lrn | dpc |
|---------|-------------|-----------|-----|-----|
| . | . | . | . | |
| versionid | | | | |
| 971009112937 | | | | |
| 971009220152 | | | | |
| . | | | | |
| . | | | | |
| . | | | | |

This database is used to store ranges of ported numbers. The start of the telephone range and the end of a telephone range are provided. Note that this database only stores the start of a range and the end of a range that belong to the same NPA-NXX. A range with only a single TN is represented by having the start and end ranges have the same TN value.
Parameter Glossary:
Rng_key: integer key used to index the database
start_range: first telephone number in the range
end_range: last telephone number in the range
lrn: location routing number
versionid: date & time that this record was written giving this record a unique version number
dpc: destination point code. Used by the SS7 network as addresses for SS7 components such as SSPs (switches), STPs or SCPs etc.

5. LATA Database

| L_Key | lata_id |
|-------|---------|
| 1 | 111 |
| 2 | 112 |
| 3 | 221 |
| . | . |
| . | . |
| . | . |

This database is a list of LATAs associated with the coverage area of the In-Switch Database. A LATA is a Local Access Transport Area as defined by Bellcore's LERG but any geographic area can be chosen to implement the database.

6. SWITCH_LATA Database
SWITCH_LATA[L_Key]

| S_Key | switch_address |
|-------|----------------|
| 1 | 48.2.3.5 |
| 2 | 48.2.3.6 |
| . | . |
| . | . |
| . | . |

This is an indexed database that identifies the switch addresses in each LATA that are affected by Local Number Portability and have an In-Switch Database. Each database is identified by a LATA (see LATA database). The switch address in this case is an IP address (Internet Protocol address) but other machine addresses that can be used for exchanging data between machines are also suitable
Parameter Glossary:
S_Key: integer key used to index the database
switch_address: machine address of the switch used by the S-SMS to exchange data with the switch. In this example, an Internet Protocol address format is used.

The term "indexed database" means a dB that may be used to store a set of related databases, as opposed to a single database. For example, with reference to FIG. 2, which shows how the S-SMS 10 can be organized to handle multiple LATAs (or other collection) switches, OSSs, ATS, STPs categorized by a LATA identifier), the LATAs are defined by a "LATA Database" (5, above), while switches in a LATA are defined by a "SWITCH-LATA Database" (6, above), the NPA-NXX download to a LATA are defined by a "PORTED-NXX Database" (2, above), etc.

Figure 3:
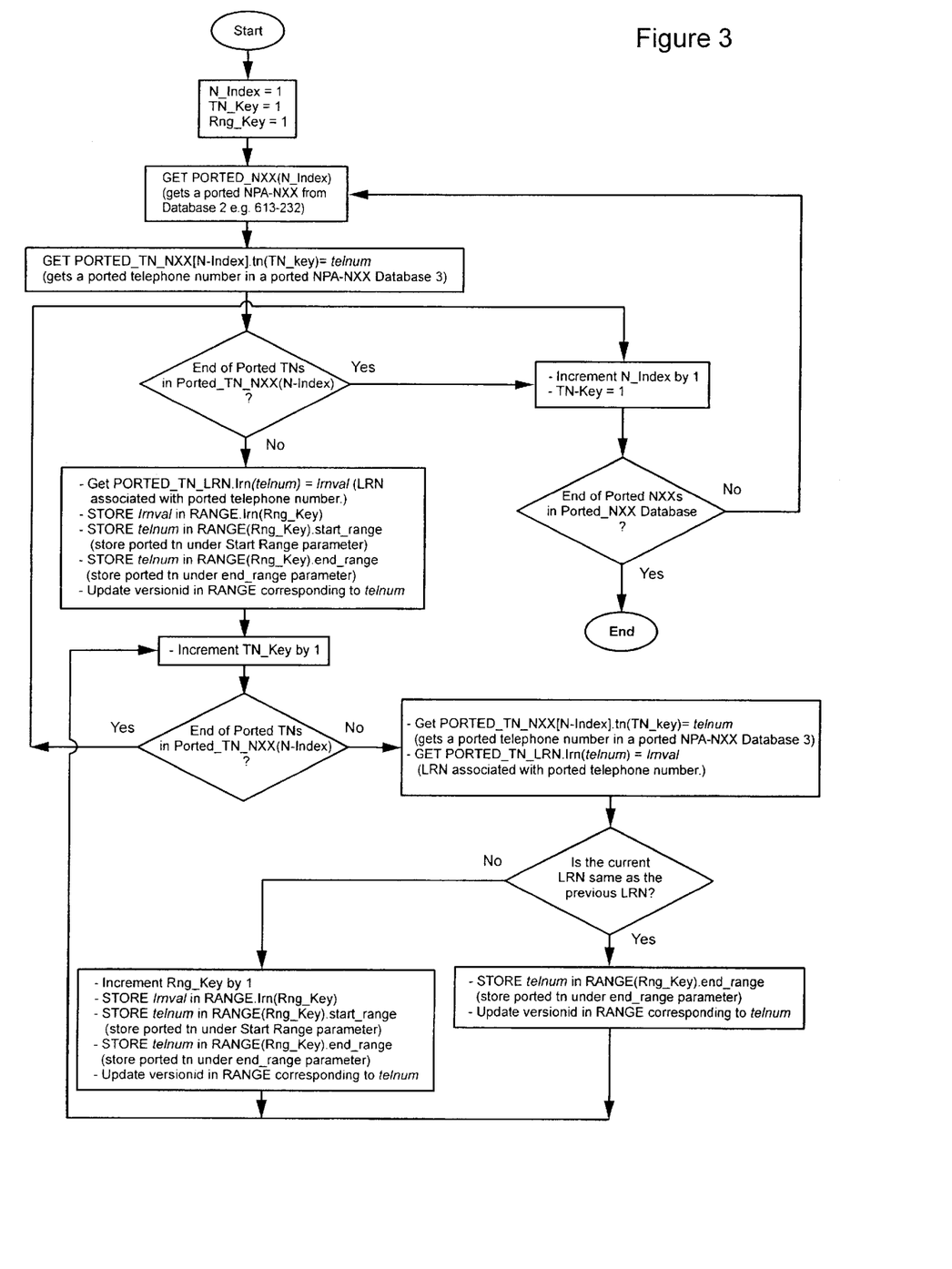
FIG. 3 is a flow-chart showing the operation of initializing the intermediate S-SMS layer of FIGS. 1 and 2.

Referring now to FIG. 3, it shows the flow-chart for initializing the S-SMS 10 by creating the "RANGE Databases" (4, above) from the ported NPA-NXX and the association of TNs with LRNs which have been downloaded from the NPAC 12. After initialization the following procedure continually updates the RANGE Database (4) by checking for updates from the NPAC 12. The procedure detects a change in Version ID (Database 1, above) when "version_id" in "PORTED_TN_LRN Database" (1) is greater than the largest "versionid" in the RANGE Database (4) and, if so, the S-SMS 10 performs the following procedure to update the RANGE Database (4):

Temporarily generate a new RANGE Database called RANGE_CHANGE Database (same format as RANGE) using the Range Algorithm for each Ported_TN that has changed its version ID.

For each new range generated in the RANGE_CHANGE Database identify the set of Rng_Keys affected in RANGE Database.

Starting with the lowest range key affected, change its start and end values to reflect changes in range. This will require setting up new ranges with new Rng_Keys if a current range is being split up. This will also require the range keys to be re-ordered into consecutive order.

Continue until all of the changes in RANGE_CHANGE Database have been incorporated into the RANGE Database.

Delete the RANGE_CHANGE Database when finished.
End.
End.

Figure 4:
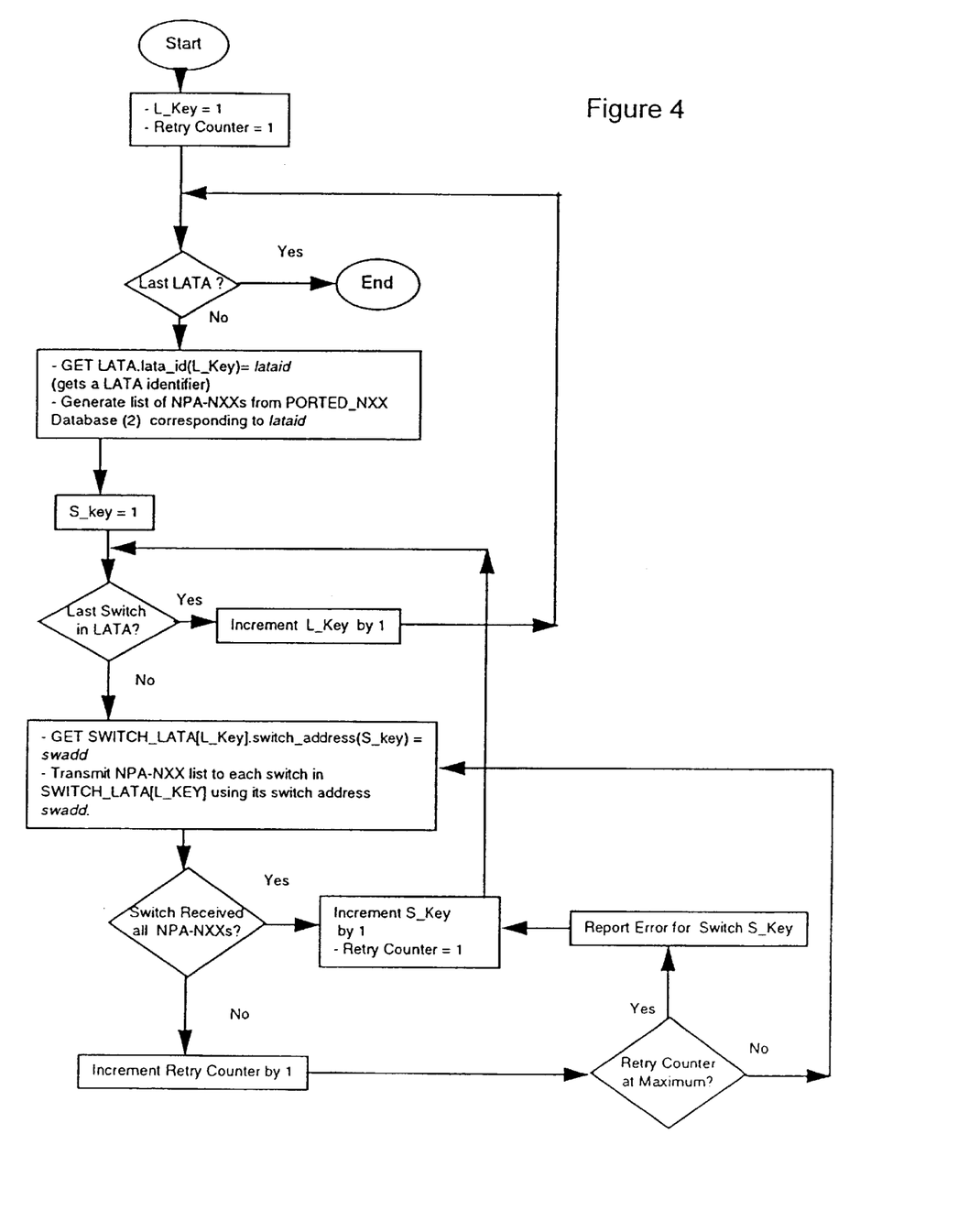
FIG. 4 is a flow-chart showing how the intermediate S-SMS layer downloads ported NPA-NXXs to switches after initialization in FIG. 4.

The flow-chart of FIG. 4 is the process which is used to download to switches the list of ported NPA-NXXs. The coverage area, i.e. the set of ported NPA-NXXs downloaded to individual switches can be changed by redefining the lata_id associated with ported NPA-NXXs in the PORTED_NXX Database (2). The list of switches that belong to a LATA is defined by the SWITCH_LATA database (6).

Figure 5:
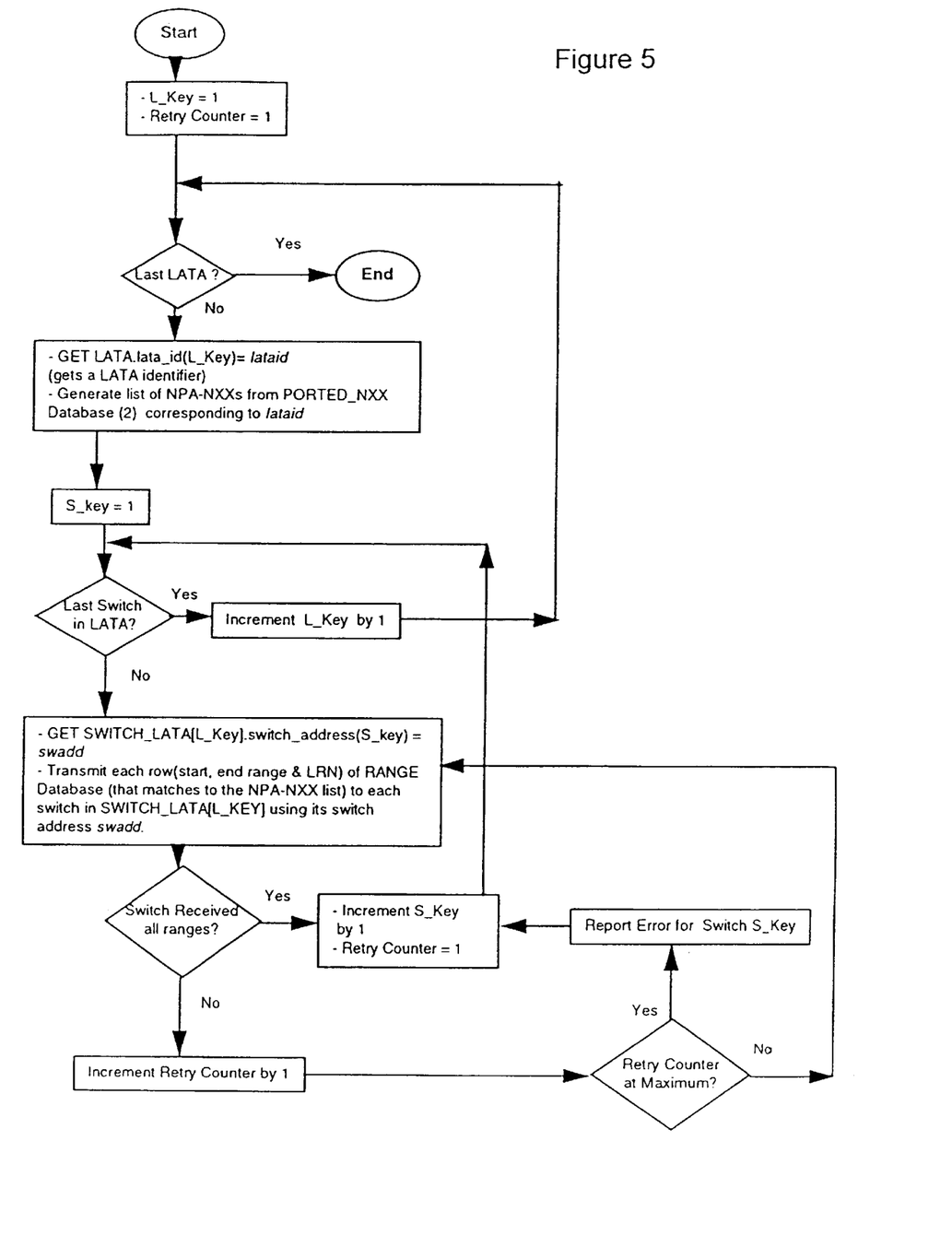
FIG. 5 is a flow-chart similar to that of FIG. 4 but for the system architecture shown in FIG. 2.

The flow-chart of FIG. 5, which is similar to that of FIG. 4, is the process which is used to download to switches the ported TN information from the RANGE Database (4). The coverage area, i.e. the set of ported NPA-NXXs downloaded to individual switches can be changed by redefining the lata_id associated with ported NPA-NXXs in the PORTED_NXX Database (2). The list of switches that belong to a LATA is defined by the SWITCH_LATA Database (6). Only TNs that match a ported NPA-NXX supported by a switch will be downloaded to that switch (e.g. if a switch is defined only to have a ported NPA-NXX of 613-232 by the Databases 2 and 6, then its in-switch dB will only receive ported TNs from 613-232).

We now to turn to the database dB at the switch itself and its routing procedures.

A SWITCH_TN Database has the simple structure illustrated below (this is the dB part of 13, 14, 15 in FIG. 1).

| tn | lrn | dpc |
|---|---|---|
| 613-232-0001 | 613-999-9991 | 111 222 333 |
| 613-232-0002 | 613-999-9991 | 111 222 333 |
| 613-565-5678 | 613-888-8888 | 222 333 444 |
| 613-565-1111 | NULL | 333 111 111 |
| 613-747-5555 | IN | 111 222 444 |

This database is essentially the In-Switch LNP database. It appears in each switch that has an In-Switch LNP database. Against all of the ported NPA-NXXs in the LATA area of a switch are stored either: its LRN, if its is a ported number; a NULL character, if the TN is not ported and belongs to another switch or IN, signifying that this TN is resident on this switch.

Parameter Glossary:
tn: ported telephone number—in this table the tn is the key used to index to the table
lrn: location routing number
dpc: destination point code. Used by the SS7 network as addresses for SS7 components such as SSPs (switches), STPs or SCPs etc.

The switch runs the following process to initialize LNP database and downloaded newly ported NPA-NXXs:
Start.
For every new ported NPA-NXX received from the S-SMS via the Update_NXX command, assign NULL against every tn in those ported NPA-NXXs in the Switch's SWITCH_TN database.
Search inventory of TNs served by the switch. Assign IN to every TN that is resident on this switch in SWITCH_TN database in the lrn parameter. This will overwrite the previous NULL value.
Wait for changes.

The switch runs the following routine to keep the SWITCH_TN Database up-to-date. It accepts changes in ported TN status from the S-SMS, additions or deletions of TNs that are not ported but are resident on the switch:
Start.
For every ported TN received from S-SMS via the Update_TN command, store the corresponding LRN value against those TNs in the Switch's SWITCH_TN database. If a switch receives its own LRN as a value in the Update_TN command, the value in the lrn field of the SWITCH_TN database is set to IN.
If a TN is removed from service (i.e. no service from any service provider) store NULL against the value of the TN.
If a TN is added to service and is not ported and resident on this switch, store the value of IN against the TN in SWITCH_TNs lrn parameter.
Wait for changes.

Figure 6:
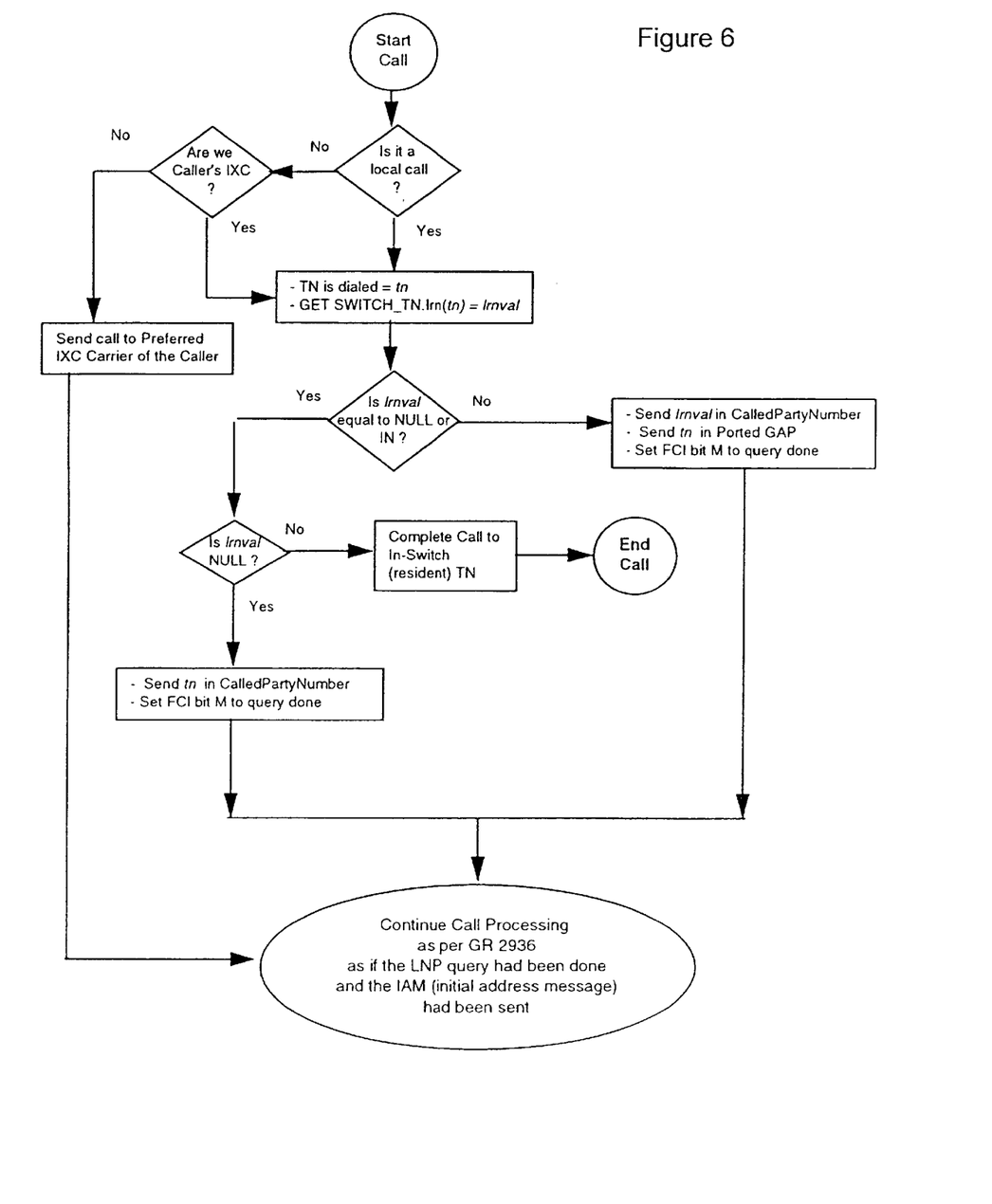
FIG. 6 is a flow-chart showing the call routing procedure of a switch once the intermediate S-SMS layer architecture shown in FIGS. 1 to 5 has been implemented in an in-switch dB.

Once the LNP dB has been initialized and set up, the switch uses it to route calls according to the process shown in FIG. 6. If the value of a dialed TN is IN: the switch will complete the call directly intra-switch since that TN is also resident on that switch. If the value is NULL: the switch will use GR-2936-CORE (post-query) procedures to route the call as if it were a non-ported TN. If the value has an LRN: the switch will use GR-2936-CORE (post-query) procedures to route the call as if it were a ported TN. If the call is a long distance call carried by a different IXC—route call to that IXC. They will determine its LRN routing. This algorithm also applies to tandems, OSS etc.

The attached Appendix (pages A1–A4) forms and constitutes an integral part of this specification.

What is claimed is:

1. An intermediate switch service management system (S-SMS) for improving local number portability (LNP) in telephony and the like switched communications system, including:

(a) a plurality of databases at said S-SMS intermediate a number portability administration center (NPAC) and a switching office;

(b) means at said S-SMS for downloading ported telephone numbers from said NPAC into said databases; and (c) means at said S-SMS for downloading selected ones from said ported telephone members into an LNP-database in said switching office.

2. The intermediate S-SMS system defined in claim 1, wherein said selected ones from said ported telephone numbers are those telephone numbers which have been ported from said switching office to another switching office.

3. A method of operating an intermediate switch service management system (S-SMS) for improving local number portability (LNP) including the steps of:

(a) maintaining a plurality of databases at said S-SMS intermediate a number portability administration center (NPAC) and a switching office;

(b) downloading ported telephone numbers from said NPAC into said databases;

(c) selecting telephone numbers that have been ported from said switching office from said ported telephone numbers; and (d) storing the telephone numbers selected in step (c) for storage in an LNP database in said switching office.

* * * * *